(12) United States Patent
Dharanipragada et al.

(10) Patent No.: US 8,229,744 B2
(45) Date of Patent: Jul. 24, 2012

(54) CLASS DETECTION SCHEME AND TIME MEDIATED AVERAGING OF CLASS DEPENDENT MODELS

(75) Inventors: Satyanarayana Dharanipragada, Ossining, NY (US); Peder A. Olsen, New York, NY (US)

(73) Assignee: Nuance Communications, Inc., Burlington, MA (US)

( * ) Notice: Subject to any disclaimer, the term of this patent is extended or adjusted under 35 U.S.C. 154(b) by 2076 days.

(21) Appl. No.: 10/649,909

(22) Filed: Aug. 26, 2003

(65) Prior Publication Data

US 2005/0049872 A1 Mar. 3, 2005

(51) Int. Cl.
 *G10L 15/00* (2006.01)
(52) U.S. Cl. .......... 704/256; 381/56; 704/222; 704/231; 704/234; 704/236; 704/239; 704/243; 704/245; 704/246; 704/247; 704/251; 704/254; 704/256.2; 704/256.5; 704/260; 704/266; 704/270; 704/275; 707/5
(58) Field of Classification Search .................. 704/236, 704/242, 239, 254, 245, 251, 222, 231, 234, 704/243, 246, 247, 256.2, 256.5, 260, 266, 704/270, 275; 381/56; 707/1, 5, 6
See application file for complete search history.

(56) References Cited

U.S. PATENT DOCUMENTS

| | | | | |
|---|---|---|---|---|
| 4,910,782 A * | 3/1990 | Watari | ............ | 704/266 |
| 5,333,275 A * | 7/1994 | Wheatley et al. | ............ | 704/243 |
| 5,440,662 A * | 8/1995 | Sukkar | ............ | 704/236 |
| 5,572,624 A * | 11/1996 | Sejnoha | ............ | 704/256 |
| 5,946,654 A * | 8/1999 | Newman et al. | ............ | 704/246 |
| 5,953,701 A * | 9/1999 | Neti et al. | ............ | 704/254 |
| 5,983,178 A * | 11/1999 | Naito et al. | ............ | 704/245 |
| 6,064,958 A * | 5/2000 | Takahashi et al. | ............ | 704/243 |
| 6,073,096 A * | 6/2000 | Gao et al. | ............ | 704/245 |
| 6,085,160 A * | 7/2000 | D'hoore et al. | ............ | 704/256.2 |
| 6,151,575 A * | 11/2000 | Newman et al. | ............ | 704/260 |
| 6,205,424 B1 * | 3/2001 | Goldenthal et al. | ............ | 704/247 |
| 6,343,267 B1 * | 1/2002 | Kuhn et al. | ............ | 704/222 |
| 6,529,902 B1 * | 3/2003 | Kanevsky et al. | ............ | 1/1 |
| 6,556,969 B1 * | 4/2003 | Assaleh et al. | ............ | 704/256.5 |
| 6,567,776 B1 * | 5/2003 | Chang et al. | ............ | 704/236 |
| 6,578,032 B1 * | 6/2003 | Chandrasekar et al. | ............ | 707/6 |
| 6,813,604 B1 * | 11/2004 | Shih et al. | ............ | 704/260 |
| 7,054,817 B2 * | 5/2006 | Shao | ............ | 704/270 |
| 7,310,600 B1 * | 12/2007 | Garner et al. | ............ | 704/234 |
| 2001/0010039 A1 * | 7/2001 | Yang | ............ | 704/239 |
| 2002/0095295 A1 * | 7/2002 | Cohen et al. | ............ | 704/275 |
| 2002/0174086 A1 * | 11/2002 | Verma et al. | ............ | 707/1 |
| 2003/0088414 A1 * | 5/2003 | Huang et al. | ............ | 704/246 |
| 2003/0110038 A1 * | 6/2003 | Sharma et al. | ............ | 704/270 |
| 2003/0144841 A1 * | 7/2003 | Shao | ............ | 704/251 |

(Continued)

OTHER PUBLICATIONS

Elsner J. B. and B. H. Bossak, 2001: Bayesian analysis of U.S. hurricane climate. J. Climate, 14, 4341-4350.*
Spyros et al, "The 1998 BBN BYBLOS Primary System applied to English and Spanish Broadcast News Transcription", 1999, DARPA Broadcast News Workshop.*
P.C. Woodland et al., Experiments in Broadcast News Transcription, Proc. ICASSP'98, pp. 1-4.

(Continued)

*Primary Examiner* — Michael Colucci
(74) *Attorney, Agent, or Firm* — Wolf, Greenfield & Sacks, P.C.

(57) ABSTRACT

A method, system, and computer program for class detection and time mediated averaging of class dependent models. A technique is described to take advantage of gender information in training data and how obtain female, male, and gender independent models from this information. By using a probability value to average male and female Gaussian Mixture Models (GMMs), dramatic deterioration in cross gender decoding performance is avoided.

26 Claims, 4 Drawing Sheets

U.S. PATENT DOCUMENTS

| | | | |
|---|---|---|---|
| 2003/0231775 A1* | 12/2003 | Wark | 381/56 |
| 2004/0030550 A1* | 2/2004 | Liu et al. | 704/231 |
| 2005/0027527 A1* | 2/2005 | Junkawitsch et al. | 704/243 |
| 2005/0251390 A1* | 11/2005 | Catchpole | 704/242 |

OTHER PUBLICATIONS

Jean-Luc Gauvain et al., The LIMSI 1998 Hub-4E Transcription System, Spoken Language Processing Group, pp. 1-6.

* cited by examiner

CLASS DETECTION SCHEME AND TIME MEDIATED AVERAGING OF CLASS DEPENDENT MODELS

FIELD OF THE INVENTION

The present invention relates data modeling, and more particularly to class dependent models and time mediated averaging of class dependent acoustic models.

BACKGROUND

Speech recognition is the process by which computers analyze sounds and attempt to characterize them as particular letters, words, or phrases. Generally, a speech recognition system is "trained" with many phoneme examples. A phoneme is a basic unit of sound in a given lexicon. For example, it is generally agreed that the English language possesses approximately 50 unique phonemes. Each phoneme may include several variations in its pronunciation, referred to as allophones. There are approximately 700 allophones in the IBM speech recognition system used hereafter for demonstration purposes. The terms allophones and phonemes are used interchangeably herein.

A speech recognition system examines various features from each phoneme example by mathematically modeling its sounds on a multidimensional landscape using multiple Gaussian distributions.

Once acoustic models of phonemes are created, input speech to be recognized is sliced into small samples of sound. Each sample is converted into a multidimensional feature vector by analyzing the same features as previously used to examine the phonemes. Speech recognition is then performed by statistically matching the feature vector with the closest phoneme model. Thus, the accuracy, or word error rate (WER), of a speech recognition system is dependent on how well the acoustic models of phonemes represent the sound samples input by the system.

Gender specific models, i.e., separate female and male acoustic models of phonemes, are known to yield improved recognition accuracy over gender independent models. The conventional use of such models is to build one system with just female models and one system with just male models. At test time, samples are decoded using both systems in a two-pass approach. While such gender specific systems provide better speech recognition results, they generally require too much computing power and resources to be practical in many real-world applications.

SUMMARY OF THE INVENTION

The present invention addresses the above-mentioned limitations of conventional speech recognition systems by generating efficient gender dependent Gaussian Mixture Models (GMMs) and integrating such models with an efficient class detection scheme. The invention determines which models contain class independent information and creates class independent models in place of such models. The invention teaches a highly accurate class detection scheme to detect class at a computational cost that is negligible.

Thus, one exemplary aspect of the present invention is a method for generating recognition models. The method includes a receiving operation to receive a first model based on a first set of training data. Another receiving operation receives a second set of training data. The first set of training data originates from a first set of common entities and the second set of training data originates from a second set of common entities. A determining operation determines if there is a difference in model information between the first model and the second model. If the difference in model information is insignificant, a creating operation creates an independent model based on the first set of training data and the second set of training data.

Another exemplary aspect of the invention is a method for recognizing data from a data stream originating from one of a plurality of data classes. The method includes receiving a current feature vector. A computing operation computes the probability that the current feature vector belongs to one of the plurality of data classes. Another computing operation computes an accumulated confidence level that the data stream belongs to one of the plurality of data classes based on the current vector probability and on previous vector probabilities. A weighing operation then weighs class models based on the accumulated confidence and a recognizing operation recognizes the current feature vector based on the weighted class models.

The foregoing and other features, utilities and advantages of the invention will be apparent from the following more particular description of various embodiments of the invention as illustrated in the accompanying drawings.

DETAILED DESCRIPTION OF THE INVENTION

The following description details how the present invention is employed to provide an efficient speech and/or voice recognition scheme. Other applications of the present invention utilizing the general principles set forth herein are also contemplated. Thus, the present invention should not be considered limited to the configurations shown and discussed herein.

Figure 1:
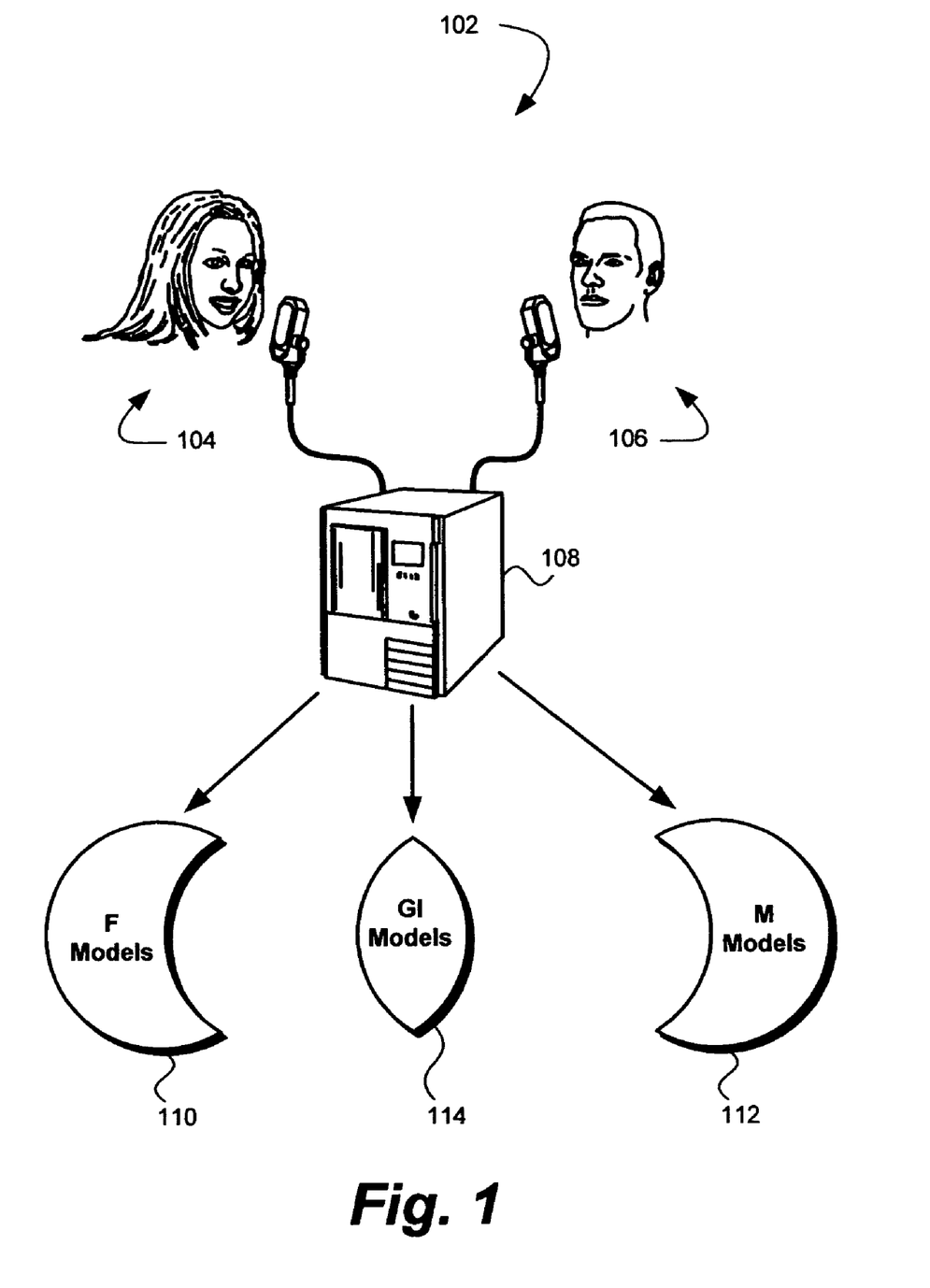
FIG. 1 shows an exemplary network environment embodying the present invention.

In FIG. 1, an exemplary model creation system 102 contemplated by the present invention is shown. The system 102 includes female training data 104 and male training data 106 coupled to a processor 108. The training data 104 and 106 contains thousands of recorded phonemes spoken by male and female speakers. Each training data is identified by its phoneme and whether it comes from a male speaker or a female speaker. In a particular embodiment of the invention, the training data 104 and 106 is configured to provide a broad representation of the phonemes required for speech recognition.

The processor 108 models the phonemes in the training data 104 and 106 by quantifying various features from the data. These features may include the data's signal frequencies, intensities, and other characteristics. In a particular embodiment of the invention, 39 features are measured by the processor 108 for each data sample. All the measured features for a given allophone have a particular probability density distribution and the processor 108 models these features using Gaussian Mixture Models (GMMs). Thus, the processor 108 creates female models 110 based solely on the female training data 104 and male models 112 based solely on the male training data 106.

The processor 108 additionally compares each female model 110 and male model 112 for each phoneme to determine if the gender separation is insignificant. Although many phonemes spoken by female speakers and male speakers sound differently, there are also many phonemes that are very similar when spoken by either male or female orators. For example, silence is obliviously gender independent. Depending on system configuration, many other allophones can exhibit gender independent qualities. Thus, the training data 104 and 106 can be visualized as a Venn diagram of two overlapping circles, with one circle representing female training data 104 and the other male training data 106. The overlapping portion of the circles is training data that is defined as gender independent.

For female and male phonemes that are insignificantly different for each other, the processor 108 combines their female and male training data 104 and 106 and creates gender independent (GI) models 114. In addition, the processor 108 removes the separate female models 110 and male models 112 that are determined to have insignificant differences from one another. The final result from the processor 108 contains female models 110 derived from female training data 104, male models 112 derived from male training data 106, and gender independent models 114 derived from both the female and male training data 104 and 106, wherein the female models 110 and male models 112 are significantly different from each other.

The model creation system 102 of the present invention beneficially reduces the amount of acoustic models needed to be stored and searched during speech recognition. Furthermore, a speech recognition system using the female, male and gender independent models 110, 112, and 114 described above requires less computing power, uses less system resources, and is more practical to implement with minimal loss in recognition accuracy.

Figure 2:
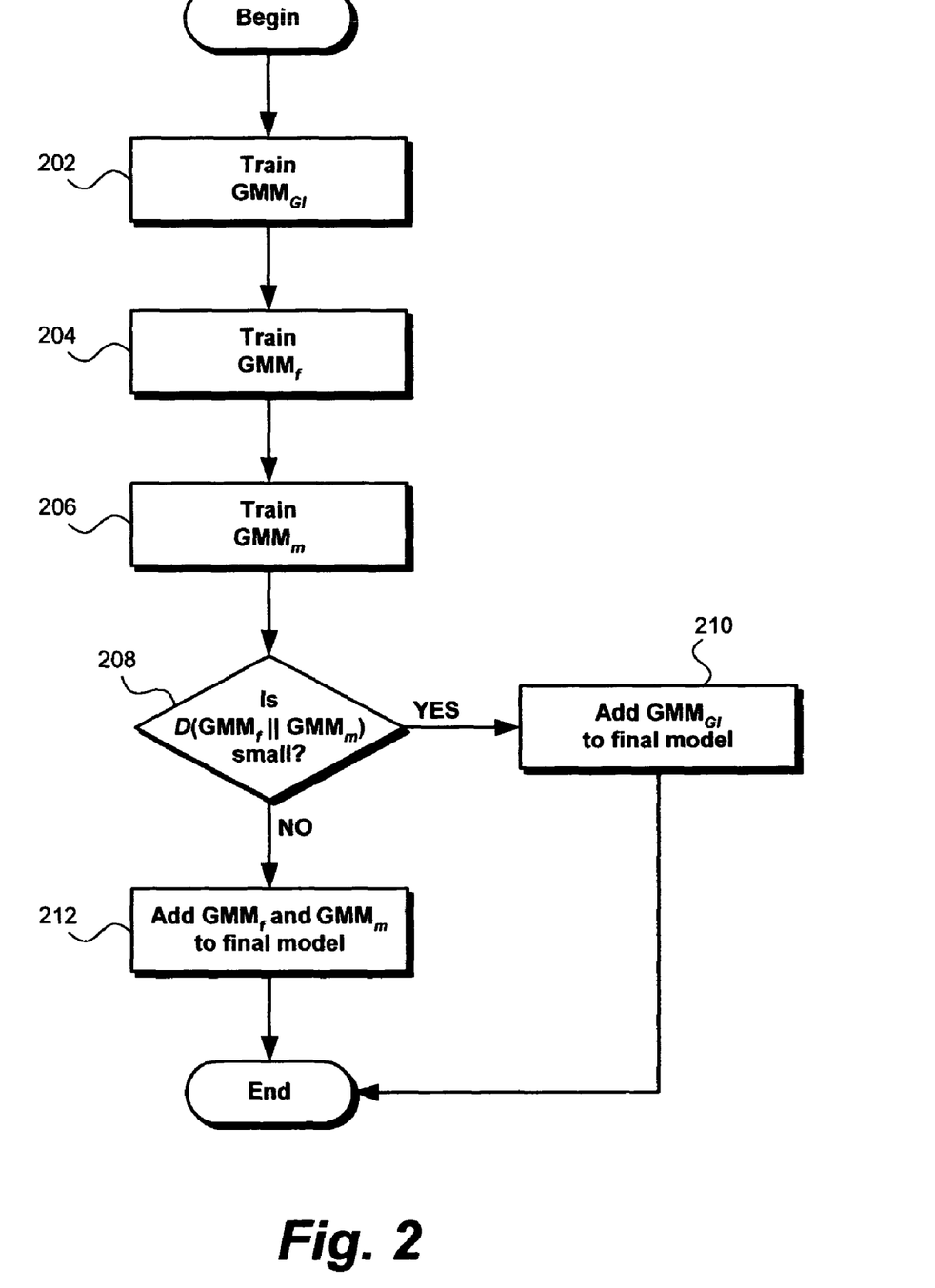
FIG. 2 shows one process for generating Gaussian models in accordance with the present invention is presented.

In FIG. 2, one process for generating GMMs in accordance with the present invention is presented. It should be remarked that the logical operations shown may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

The process begins with training operation 202. During this operation, gender independent models ($GMM_{GI}$) are created from both the female and male training data. In experiments conducted using one embodiment of the invention, the female and male training data consisted of a total of 462,388 utterances, out of which 228,693 corresponded to female speakers and 233,695 corresponded to male speakers. The training data was collected from stationary and moving car conditions. Training data in the moving car was acquired at car speeds of 30 mph and 60 mph. Data was recorded in several different cars with microphones placed at rear-view mirror, visor, and seatbelt locations. The training data was also appended by synthetically adding noise, collected in a car, to the stationary car data.

The baseline acoustic model of these experiments consisted of a standard 39 dimensional Fast Fourier Transform (FFT) based Mel-Filtered Cepstral Coefficients (MFCC) front-end (13 dimensional cepstal vectors and corresponding $\Delta$ and $\Delta\Delta$ cepstral vectors spliced together). Digits were modeled by defining word specific digit phonemes, yielding word models for digits. In total, 680 word internal triphones were used to model acoustic context and the Gaussian Mixture Models used to model the individual allophones consisted of a total of 10,253 Gaussians. The number of Gaussians assigned to each allophone was determined using Bayesian Information Criterion, as described in S. S. Chen and R. A. Gopinath, "Modeling Selection in Acoustic Modeling," in *Eurospeech*, Budapest, Hungary, September 1999.

In testing the system, the test data was also well balanced between genders. It consisted of a total of 74,743 words, out of which 36,241 words were uttered by female speakers and 37,502 by male speakers. The test data comprises of 22 speakers recorded in a car moving at speeds of 0 mph, 30 mph, and 60 mph. Four tasks were considered: address (A), commands (C), digits (D), and radio control (R). The following are typical utterances from each task:

(A) NEW YORK CITY NINETY SIXTH STREET WEST (C) SET TRACK NUMBER TO SEVEN (D) NINE THREE TWO THREE THREE ZERO ZERO (R) TUNE TO F.M. NINETY THREE POINT NINE

Once the gender independent models ($GMM_{GI}$) are created and trained at training operation 202, control passes to training operations 204 and 206. During training operation 204, female models ($GMM_f$) are created and trained from just the female training data. Similarly, at training operation 206, male models ($GMM_m$) are created and trained using just the male training data. It is noted that training operations 202, 204 and 206 may be performed in sequence or in parallel, depending on system configuration. After training operations 202, 204 and 206 are completed, control passes to determining operation 208.

At determining operation 208, the female models are compared with the male models to determine if their differences are insignificant. In one embodiment of the invention, the difference between two acoustic models for a phoneme X is measured using the Kullback Leibler divergence:

$$D(f \| m) = \int_{\mathcal{X}^d} \log\left(\frac{f(x)}{m(x)}\right) f(x) dx.$$

If $f=GMM_f(X)$ and $m=GMM_m(X)$ consists of a single Gaussian, then the above equation can be computed exactly. Otherwise, the distance is computed numerically. Monte Carlo estimation can be used to compute the integral in the general case. Let $\{X\}_{i=1}^n$ be n samples from the distribution $f(x)$, then $$\int_{\mathcal{X}^d} \log m(x) dx \approx \frac{1}{n} \sum_{i=1}^{n} \log m(x_i).$$

Using the Kullback Leibler distance, the phonemes that vary little between gender can be discovered. Table 1 shows a list of phonemes with smallest and largest Kullback Leibler distances, as computed during one experiment of the present invention.

TABLE 1

Top few context dependent phonemes (allophones) with largest and smallest Kullback Leibler distance.

| D(f‖g) | Phoneme | D(f‖g) | Phoneme |
|---|---|---|---|
| 0.5059 | FD_3 | 18.3031 | OW_1 |
| 0.5322 | F_1 | 16.8553 | EH_1 |
| 0.5626 | F_2 | 16.6865 | ER_3 |
| 0.6652 | F_3 | 16.3531 | EY_3 |
| 0.7608 | H_1 | 16.3488 | EH_1 |
| 0.7662 | SIL_1 | 16.3469 | EH_2 |

The experiment results were achieved using gender dependent acoustic models with 6.3K Gaussians and gender independent models with 7K Gaussians. To combine these models, the Kullback Leibler distance between all context dependent phonemes was computed and sorted. An upper limit of 10K total Gaussians was placed on the system output. Combining the 6.3K male and female acoustic models gives a total of 12.6K Gaussians. To reduce the number of Gaussians, the context dependent phonemes were sorted according to their Kullback Leibler distance and replace with Gaussians from the gender independent Gaussians starting with the smallest distance first. When the number of Gaussians came below 10K, the process was stopped. Table 2 shows the decoding results of this experiment. The variables $\pi_f$ and $\pi_m$ occurring in Table 2 are the weights referred to earlier. These weights are discussed in detail below.

TABLE 2

Word error rates for time mediated averaging of the gender dependent diagonal GMMs with shared Gaussians.

| Test Gender | Baseline | $\pi_f$ * GMM$_f$ + $\pi_m$ * GMM$_m$ |
|---|---|---|
| Both | 3.34% | 2.80% |
| Female | 4.40% | 3.55% |
| Male | 2.32% | 2.07% |

Thus, the decision whether or not the female and male phoneme models carry gender information may be based on a maximum allowable number of Gaussians in the system. Alternatively, the decision may be based on a threshold Kullback Leibler distance value. Other methods known to those skilled in art for determining if the difference in information between the female and male models is insignificant may be utilized by the present invention.

For those phonemes which determining operation 208 returns an evaluation that the gender information they carry is insignificant, control passes to adding operation 210. At adding operation 210, the gender independent models (GMM$_{GI}$) for these phonemes are added to a final system model.

For those phonemes which determining operation 208 returns an evaluation that the gender information they carry is significant, control passes to adding operation 212. At adding operation 212, separate female models (GMM$_f$) and male models (GMM$_m$) for phonemes with significant gender information are added to the final system model. The process ends after examination of all the phoneme models is completed.

In one experiment of the present invention, the improvement in the oracle model for the merged 5K gender models were noticeably smaller than for the 10K models, but still substantial. When using a gender detection scheme to detect gender, there will inevitably be errors, especially at times of gender changes. Since cross-gender performance is very poor, a scheme with a less dramatic deterioration in the word error rate is desirable. The gender independent 10K GMMs is of course such a model. Table 3 shows the performance for three different interpolation values for the diagonal covariance GMMs. The performance of the model where the male and female GMMs are equally interpolated was only slightly worse than the performance of the gender independent models. What this means is that if it is difficult to assess the gender, one can simply use the model 0.5*GMM$_f$+0.5*GMM$_m$ at little cost in accuracy.

TABLE 3

Word error rates for interplated gender dependent diagonal GMMs.

| Test Gender | 0.5 * GMM$_f$ + 0.5 * GMM$_m$ | 0.8 * GMM$_f$ + 0.2 * GMM$_m$ | GMM$_f$ |
|---|---|---|---|
| Both | 3.51% | 3.44% | 6.75% |
| Female | 4.60% | 4.04% | 3.45% |
| Male | 2.46% | 2.87% | 9.93% |

Let $p_f$, $p_m$, and $p_f+p_m=1$ represent how the certainty that speech originated from a speaker of a particular gender. If the only acoustics observed from a speaker is a single frame $x_t$ the best estimate for $p_f$ is the a posteriori gender probability, $$\gamma_{f,t} = \frac{\sum_{g \in F} N\left(x_i; \sum_g, \mu_g\right)}{\sum_{g \in G} N\left(x_i; \sum_g, \mu_g\right)}$$

where G is the collection of all Gaussians and F and M are the collection of Gaussians corresponding to male and female speakers. With more speech, the estimate can of course be improved. With frames $x_1, \ldots, x_T$ a reasonable estimate for $p_f$ is simply, $$p_f(T) = \frac{1}{n}\sum_{t=2}^{T} \gamma_{f,t}.$$

The problem with this estimate is that it does not easily allow detection of a change of speaker. One possible method to fix this is to not use all previous frames, but to create a moving window, i.e., $$p_f(T) = \frac{1}{n}\sum_{t=T-n}^{T} \gamma_{f,t}.$$

This strategy requires the memorization of the previous n−1 values of $\gamma_{f,t}$. Also, this strategy weights each previous sample equally. Intuitively, the most current acoustic information should carry more weight than the older acoustic information. A probability distribution solving these two problems is the discrete geometric probability distribution $q_i=(1-a)a^i$, $i=0, 1, \ldots$. With this distribution $p_f(T)$ is defined by, $$p_f(T) = \sum_{t=0}^{\infty} q_t \gamma_{f,T-1}.$$

Figure 3:
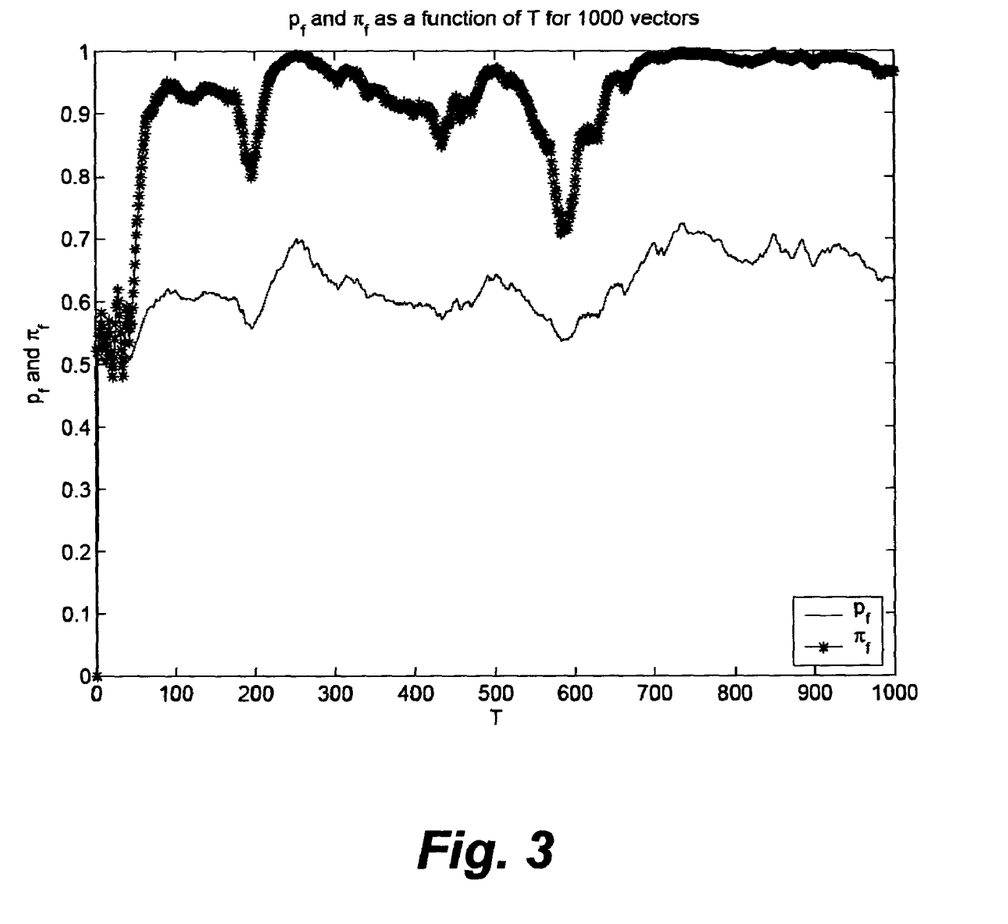
FIG. 3 shows a graph of $p_f(T)$ and $n_f(T)$ for the first 1,000 cepstral vectors uttered by female speakers in one embodiment of the present invention.

This quantity can now be efficiently computed by the formula, $$p_f(T) = a \ast p_f(T-1) + (1-a) \ast \gamma_{f;T-1},$$

requiring only the memorization of $p_f(T-1)$. The mean of $q_i$ is $a(1-a)$ which can be interpreted as the effective window size when using the weights $q_i$. In one embodiment of the speech recognizer, cepstral vectors were computed every 15 ms and a was chosen so that $a(1-a)=100$. Thus, the effective gender switching time for $p_f(T)\ast GMM_f + p_m(T)\ast GMM_m$ is of the order of 1.5 seconds. The decoding result with the acoustic model $p_f(T)\ast GMM_f + p_m(T)\ast GMM_m$ is given in Table 4. This acoustic model did not capture much of the gain inherently available in the oracle model. Detailed analysis shows that this is due to $p_f(T)$ and $p_m(T)$ being very close to 0.5. This could mean that $p_f(T)$ is not a good predictor that speech originated from a female speaker, but luckily this is not so since $p_f(T)$ tend indeed to be greater than 0.5 for female speech, as can be seen in FIG. 3. The cure that is needed is a "sharpening" of the a posteriori probabilities $p_f(T)$ and $p_m(T)$. The boosted gender detection probabilities $\pi_f(T)$ and $\pi_m(T)$ is introduced by, $$\pi_f(T) = \frac{p_f(T)^\beta}{p_f(T)^\beta + p_m(T)^\beta}$$

As $\beta$ increases, the sharper the $\pi_f(T)$ and $\pi_m(T)$ probabilities become. Table 4 also shows results for decoding with the model $\pi_f(T)\ast GMM_f + \pi_m(T)\ast GMM_m$ for $\beta=6$. As can be seen, almost all of the gain in the oracle model, which has an error rate of 2.75%, is captured by this acoustic model.

TABLE 4

Word error rates for time mediated averaging of gender dependent diagonal GMMs.

| Test Gender | Baseline | $p_f\ast GMM_f +$ $p_m\ast GMM_m$ | $\pi_f\ast GMM_f +$ $\pi_m\ast GMM_m$ |
|---|---|---|---|
| Both | 3.34% | 3.29% | 2.88% |
| Female | 4.40% | 4.26% | 3.61% |
| Male | 2.32% | 2.34% | 2.18% |

Figure 4:
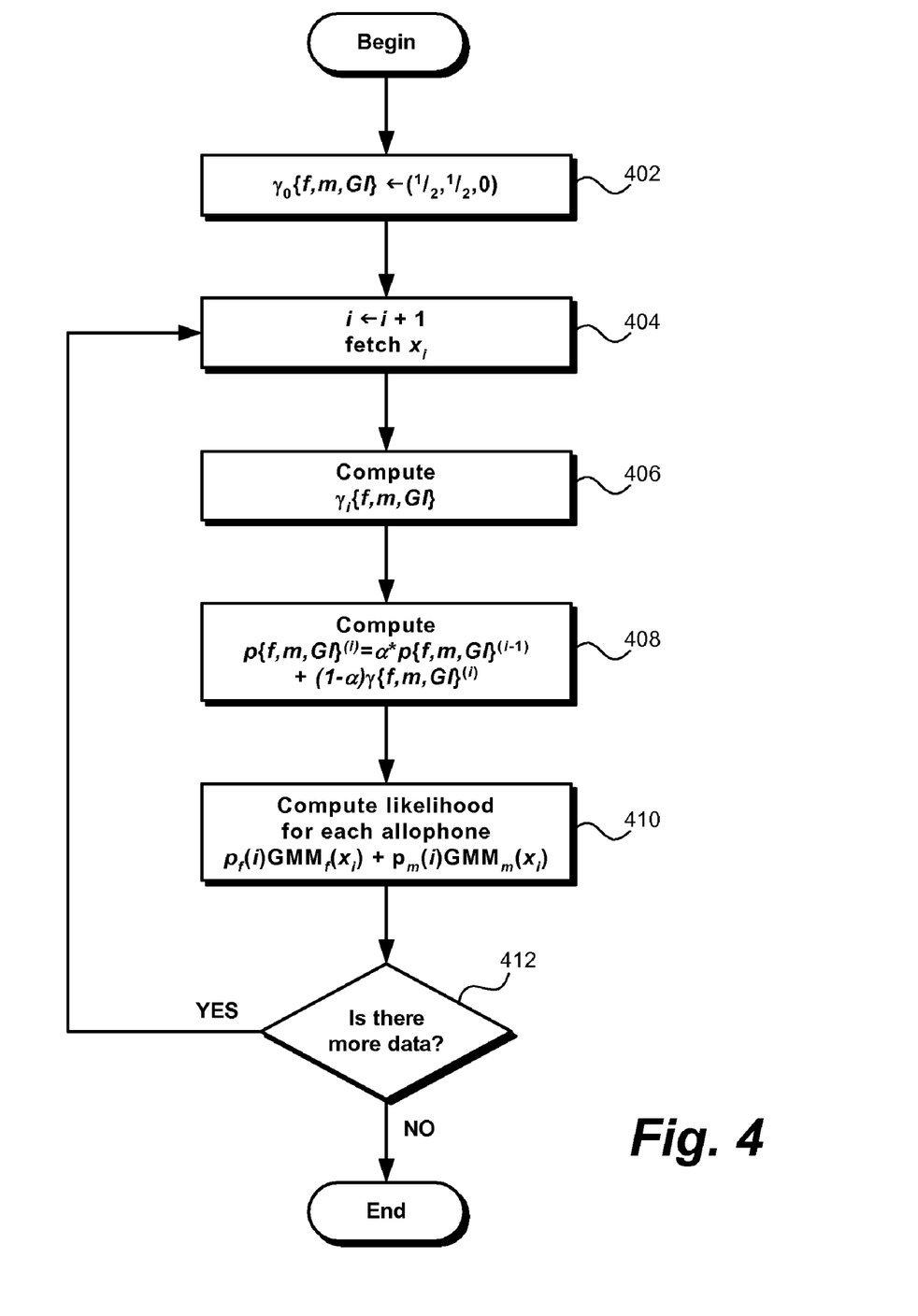
FIG. 4 shows one process for speech recognition, as contemplated by the present invention.

Turning now to FIG. 4, one process for speech recognition, as contemplated by the present invention, is shown. The process begins at initializing operation 402. During this operation, the initial confidence that the speaker is female, male, or gender independent, as assigned to $\gamma_0$, is set to 50%, 50%, and 0% respectively. Thus, the probability that the speaker is female or male, without receiving any speech samples, is set equal. Once initializing operation 402 is completed, control flow passes to fetching operation 404.

At fetching operation 404, the next sound sample from an audio stream is acquired. In a particular embodiment of the invention, a 25 ms frame sample of the audio stream is moved along at 15 ms intervals. Thus, a time-varying snapshot of the audio stream is used to generate multidimensional feature vectors of the audio stream. As shown, the time index is contained in i, and $x_i$ is the current multidimensional feature vector. Once $x_i$ is acquired by the system, control passes to computing operation 406.

At computing operation 406, the best estimate of whether the speaker is female, male, or gender independent, based on the current sample frame is made. The computation of $\gamma_i$ is carried out as described in detail above. Once $\gamma_i$ is determined, control passes to computing operation 408.

At computing operation 408, the accumulated gender confidence p is computed. The accumulated gender confidence is a running weighted average over time of the speaker's gender. Thus, if the current frame sample contains gender-neutral content, both the male and female confidences will fall. Conversely, if the current frame sample contains female content, both the male and gender independent (GI) confidences will fall. A forgetting factor $\alpha$ is utilized to place more emphasis on the gender confidence level of the current sample frame and exponentially decreasing importance on the gender confidence levels of previous sample frames. Once $p_f$, $p_m$ and $p_{GI}$ confidence levels are computed, control passes to computing operation 410.

At computing operation 410, the accumulated female and male gender confidences $p_f$ and $p_m$ are used to weight the female and male models. The combined likelihoods of the male and female models at this step are used in a speech recognition system to search for the sequence of words that is most probable. The probability of a particular word sequence is computed according to a language model and the product of likelihoods for each allophones that the word sequence is comprised of. Such a computation is well known to a person versed in the design of speech recognition systems. It is noted that although FIG. 4 shows the computation using the confidences $p_f$ and $p_m$, it could equally well use the boosted gender detection probabilities $\pi_f$ and $\pi_m$ or any other set of accumulated gender confidences. After computing operation 410 is completed, control flow proceeds to decision operation 412.

At decision operation 412, the data stream is checked for more data. If more data exists, control returns to fetching operation 404, where the next feature vector is obtained. If no more data exists in the data stream, the process is terminated.

In some applications of the present invention, evaluation of all Gaussians for every frame in a real time speech recognizer as described above may be impractical. Therefore, in one embodiment of the invention, only a small set of Gaussians are evaluated for each frame to compute $\pi_f(T)$. As most speech recognizers are highly optimized with respect to computational cost, even the computation of $\pi_f(T)$ and $\pi_m(T)$ can be prohibitively expensive. One way to save on the computation is to further reduce the number of Gaussians available in the computation of $\pi_f(T)$ and $\pi_m(T)$. In the extreme where only one Gaussian is kept, the quantity $\gamma_{f,t}$ is either 0 or 1. This case is denoted by $\pi'_f(T)$ and $\pi'_m(T)$. The computation of $\pi'_f(T)$ now merely corresponds to simple counting and the evaluation of $$\pi_f(T) = \frac{p_f(T)^\beta}{p_f(T)^\beta + p_m(T)^\beta}.$$

Table 5 shows word error rates for decodings with fast hierarchical evaluation of GMMs and a fast gender detection scheme.

TABLE 5

Word error rates for decodings with fast hierarchical evaluation of GMMs and a fast gender detection scheme.

| Test Gender | Baseline | $p_f\ast GMM_f +$ $p_m\ast GMM_m$ | $\pi'_f\ast GMM_f +$ $\pi'_m\ast GMM_m$ |
|---|---|---|---|
| Both | 3.34% | 3.29% | 2.88% |
| Female | 4.40% | 4.26% | 3.61% |
| Male | 2.32% | 2.34% | 2.18% |

It is contemplated that retraining gender averaged acoustic models can be achieved by letting the Expectation Maximization algorithm automatically discover common structures in the acoustic models. If $\pi_f(T)$ and $\pi_m(T)$ are forced to take on the values 0 or 1 according to the gender of the speaker in the training data, the new models will not differ from the current models. Similarly, experiments showed that using the values $\pi_f(T)$ described for decoding does not yield any gains either. However, word error rate improvements are achieved if $\pi_f(T)$ and $\pi_m(T)$ are fixed to 0.5 and the following procedure is followed. First, collect statistics on the female training data with the composite model, but update only the Gaussians corresponding to the female speakers. Then repeat for male speakers and iterate this procedure. The improvements after several iterations are shown in Table 6.

TABLE 6

Word error rates for retrained averaged gender dependent GMMs.

| Test Gender | $\pi_f * GMM_f + \pi_m * GMM_m$ | Retrained |
|---|---|---|
| Both | 3.23% | 3.09% |
| Female | 3.87% | 3.63% |
| Male | 2.61% | 2.57% |

The foregoing description of the invention has been presented for purposes of illustration and description. It is not intended to be exhaustive or to limit the invention to the precise form disclosed, and other modifications and variations may be possible in light of the above teachings. For example, those skilled in the art may apply the teaching of the present invention to optical character recognition (OCR) systems. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. At least one non-transitory computer readable medium encoded with instructions that, when executed by at least one processor, perform a method for generating a speech recognition model, the method comprising:
receiving female speech training data;
generating female phoneme models based on the female speech training data;
receiving a male speech training data;
generating male phoneme models based on the male speech training data;
determining a difference between each female phoneme model and each corresponding male phoneme model;
creating a gender-independent phoneme model when the difference between the compared female phoneme model and the corresponding male phoneme model is less than a predetermined value; and
adding, based on at least one criteria, one of the gender-independent phoneme model, or both the female phoneme model and the corresponding male phoneme model to the speech recognition model.

2. The at least one non-transitory computer readable medium of claim 1, wherein the at least one criteria comprises a threshold value or an upper limit for the total number of phoneme models in the speech recognition model.

3. The at least one non-transitory computer readable medium of claim 1, wherein determining the difference includes calculating a Kullback Leibler distance between the each female phoneme model and the each corresponding male phoneme model.

4. The at least one non-transitory computer readable medium of claim 3, wherein the difference is a Kullback Leibler distance quantity.

5. The at least one non-transitory computer readable medium of claim 1, wherein the female phoneme models, the male phoneme models, and the gender-independent phoneme models are Gaussian mixture models.

6. A system for generating a speech recognition model, the system comprising:
an input to receive speech training data; and
a computer processor coupled to the input, the computer processor configured to:
receive a first set of speech training data, the first set of speech training data originating from a first set of common entities;
generate first phoneme models based on the first set of speech training data;
receive a second set of speech training data, the second set of speech training data originating from a second set of common entities;
generate second phoneme models based on the second set of speech training data;
determine a difference between each first phoneme model and each corresponding second phoneme model;
create an independent phoneme model when the difference between the compared each first phoneme model and each corresponding second phoneme model is less than a predetermined value; and
add, based upon at least one criteria, one of the independent phoneme model, or both the first phoneme model and the corresponding second phoneme model to the speech recognition model.

7. The system of claim 6, wherein the at least one criteria comprises a threshold value or an upper limit for the total number of phoneme models in the speech recognition model.

8. The system of claim 6, wherein the computer processor is further configured to calculate a Kullback Leibler distance between the each first phoneme model and the each corresponding second phoneme model.

9. The system of claim 8, wherein the difference is a Kullback Leibler distance quantity.

10. The system of claim 6, wherein the first phoneme models, the second phoneme models, and the independent phoneme models are Gaussian mixture models.

11. A computer program product embodied in computer memory comprising:
computer readable program codes executable on a computer system for generating a speech recognition model, the computer readable program codes configured to cause the system to:
receive a first set of speech training data, the first set of speech training data originating from a first set of common entities;
generate first phoneme models based on the first set of speech training data;
receive a second set of speech training data, the second set of speech training data originating from a second set of common entities;
generate second phoneme models based on the second set of speech training data;
determine a difference between each first phoneme model and each second phoneme model;

create an independent phoneme model when the difference between the each first phoneme model and the each corresponding second phoneme model is less than a predetermined value; and add, based on at least one criteria, one of the independent phoneme model, or both the first phoneme model and the corresponding second phoneme model to the speech recognition model.

12. The computer program product of claim 11, wherein the at least one criteria comprises a threshold value or an upper limit for the total number of phoneme models in the speech recognition model.

13. The computer program product of claim 11, wherein the determining the difference includes calculating a Kullback Leibler distance between the each first phoneme model and the each corresponding second phoneme model.

14. The computer program product of claim 13, wherein the difference is a threshold Kullback Leibler distance quantity.

15. The computer program product of claim 11, wherein the first phoneme models, the second phoneme models, and the independent phoneme models are Gaussian mixture models.

16. At least one non-transitory computer readable medium encoded with instructions that, when executed by at least one processor, perform a method for recognizing speech from an audio stream originating from one of a plurality of data classes, each data class having class-dependent phoneme models, the method comprising:

receiving a current feature vector of the audio stream;

computing best estimates that the current feature vector belongs to each one of the plurality of data classes;

computing accumulated confidence values for each of the plurality of data classes that the current feature vector belongs to each one of the plurality of data classes, the confidence value for each data class of the plurality of data classes based on the current best estimate for the data class and on previous confidence values for the data class, the previous confidence values associated with previous feature vectors of the audio stream;

weighing the class-dependent phoneme models based on the accumulated confidence values; and recognizing the current feature vector based on the weighted class-dependent phoneme models.

17. The at least one non-transitory computer readable medium of claim 16, wherein computing best estimates includes estimating an a posteriori class probability for the current feature vector.

18. The at least one non-transitory computer readable medium of claim 16, wherein computing accumulated confidence values further comprises weighing the current confidence values more than the previous confidence values.

19. The at least one non-transitory computer readable medium of claim 16, the method further comprising determining if another feature vector is available for analysis.

20. A system for recognizing speech data from an audio stream originating from one of a plurality of data classes, each data class having class-dependent phoneme models, the system comprising:

a computer processor;

a receiving module configured to receive a current feature vector of the audio stream;

a first computing module configured to compute current best estimates that the current feature vector belongs to each one of the plurality of data classes;

a second computing module configured to compute accumulated confidence values for each of the plurality of data classes that the current feature vector belongs to each one of the plurality of data classes, the confidence value for each data class of the plurality of data classes based on the current best estimate for the data class and on previous confidence values for the data class, the previous confidence values associated with previous feature vectors of the audio stream;

a weighing module configured to weigh the class-dependent phoneme models based on the accumulated confidence values; and a recognizing module configured to recognize the current feature vector based on the weighted class-dependent phoneme models.

21. The system of claim 20, wherein the first computing module is further configured to estimate an a posteriori class probability for the current feature vector.

22. The system of claim 20, wherein the second computing module is further configured to weigh the current confidence values more than the previous confidence values.

23. A computer program product embodied in computer memory comprising:

computer readable program codes executable on a computer system for recognizing speech data from an audio stream originating from one of a plurality of data classes, each data class having class-dependent phoneme models, the computer readable program codes configured to cause the system to:

receive a current feature vector of the audio stream;

compute best estimates that the current feature vector belongs to each one of the plurality of data classes;

compute accumulated confidence values for each of the plurality of data classes that the current feature vector belongs to each one of the plurality of data classes, the confidence value for each data class of the plurality of data classes based on the current best estimate for the data class and on previous confidence values for the data class, the previous confidence values associated with previous feature vectors of the audio stream;

weigh the class-dependent phoneme models based on the accumulated confidence values; and recognize the current feature vector based on the weighted class-dependent phoneme models.

24. The computer program product of claim 23, wherein the program code configured to cause the system to compute the current best estimates includes program code configured to cause the system to determine an a posteriori class probability for the current feature vector.

25. The computer program product of claim 23, wherein the program code configured to cause the system to compute the accumulated confidence values includes program code configured to cause the system to weigh the current confidence values more than the previous confidence values.

26. The computer program product of claim 23, further comprising program code configured to cause the system to determine if another feature vector is available for analysis.

* * * * *